(12) United States Patent
Cummins et al.

(10) Patent No.: US 11,794,483 B2
(45) Date of Patent: Oct. 24, 2023

(54) DELIVERY TRAY MOUNTING SYSTEM FOR FOOD PRODUCT PRINTER

(71) Applicant: Primera Technology, Inc., Plymouth, MN (US)

(72) Inventors: Robert P. Cummins, Deephaven, MN (US); Todd Britz, Maple Grove, MN (US); Erick Hagstrom, Wayzata, MN (US)

(73) Assignee: PRIMERA TECHNOLOGY, INC., Plymouth, MN (US)

( * ) Notice: Subject to any disclaimer, the term of this patent is extended or adjusted under 35 U.S.C. 154(b) by 191 days.

(21) Appl. No.: 16/985,851

(22) Filed: Aug. 5, 2020

(65) Prior Publication Data

US 2021/0059291 A1      Mar. 4, 2021

Related U.S. Application Data

(60) Provisional application No. 62/894,323, filed on Aug. 30, 2019.

(51) Int. Cl.
*B41J 13/00*   (2006.01)
*B41M 5/00*    (2006.01)
(Continued)

(52) U.S. Cl.
CPC .......... *B41J 2/17563* (2013.01); *A21D 13/24* (2017.01); *A21D 13/80* (2017.01); *A23P 20/18* (2016.08);
(Continued)

(58) Field of Classification Search
CPC  B41J 3/40731; B41J 13/0009; B41M 5/0041; A21C 9/083; A21D 13/47
See application file for complete search history.

(56) References Cited

U.S. PATENT DOCUMENTS

| 4,339,993 A | 7/1982 | Lee |
| 4,981,074 A | 1/1991 | Machita et al. |

(Continued)

FOREIGN PATENT DOCUMENTS

| CN | 1868754 A | 11/2006 |
| CN | 201325212 Y | 10/2009 |

(Continued)

OTHER PUBLICATIONS

International Search Report issued for PCT/US2020/048406, dated Nov. 26, 2020.

(Continued)

*Primary Examiner* — Jennifer Bahls
(74) *Attorney, Agent, or Firm* — Westman, Champlin & Koehler, P.A.; Z. Peter Sawicki; Amanda M. Prose

(57) ABSTRACT

A printer and corresponding method of printing an image on a surface of a plurality of food products by providing a system having a printer with an extendable and retractable receiving arm and a movable food product delivery tray for continuously and automatically providing delivery of unprinted food products which are retracted into the printer, printed on, and returned by the receiving arm to the rotatable delivery tray and the tray further moves to deliver subsequent food products for printing. A motorized base spaced apart from the printer supports the delivery tray during and printing processes.

16 Claims, 9 Drawing Sheets

(51) Int. Cl.
*B41J 2/175* (2006.01)
*B41J 2/17* (2006.01)
*A23P 20/18* (2016.01)
*B41J 3/407* (2006.01)
*B41J 29/02* (2006.01)
*A23P 20/20* (2016.01)
*A21D 13/80* (2017.01)
*A21D 13/24* (2017.01)
*B41J 29/17* (2006.01)
*B29C 64/00* (2017.01)
*A23P 20/25* (2016.01)

(52) U.S. Cl.
CPC .............. *A23P 20/20* (2016.08); *B29C 64/00* (2017.08); *B41J 2/1714* (2013.01); *B41J 2/1721* (2013.01); *B41J 3/407* (2013.01); *B41J 3/4073* (2013.01); *B41J 3/40731* (2020.08); *B41J 13/0009* (2013.01); *B41J 29/02* (2013.01); *B41J 29/17* (2013.01); *B41M 5/0041* (2013.01); *B41M 5/0047* (2013.01); *A23P 2020/253* (2016.08)

(56) References Cited

U.S. PATENT DOCUMENTS

| | | | |
|---|---|---|---|
| 5,505,775 A | 4/1996 | Kitos | |
| 5,795,395 A | 8/1998 | Ben-Matitayhu et al. | |
| 5,988,787 A | 11/1999 | Watanabe et al. | |
| 6,230,073 B1 * | 5/2001 | Kofman | B41J 2/01 426/87 |
| 6,923,115 B1 * | 8/2005 | Litscher | B41J 3/40731 101/DIG. 40 |
| 8,281,715 B2 * | 10/2012 | Lehner | B41J 3/407 101/35 |
| 2004/0114192 A1 | 6/2004 | Jensen | |
| 2006/0119628 A1 | 6/2006 | Kofman et al. | |
| 2009/0021548 A1 | 1/2009 | Suzuki et al. | |
| 2010/0091054 A1 | 4/2010 | Vesanto et al. | |
| 2011/0025735 A1 | 2/2011 | Nohilly et al. | |
| 2012/0141636 A1 | 6/2012 | Ackley, Jr. et al. | |
| 2018/0118397 A1 * | 5/2018 | Blackford | B26D 5/08 |

FOREIGN PATENT DOCUMENTS

| | | | | |
|---|---|---|---|---|
| CN | 105346266 A | 2/2016 | | |
| CN | 207128411 U | 3/2018 | | |
| EP | 497253 A1 * | 8/1992 | ............ | B65H 29/12 |
| EP | 3332978 A1 | 6/2018 | | |
| JP | 5346728 A | 12/1993 | | |
| JP | 2005327918 A | 11/2005 | | |
| JP | 2007136729 A | 6/2007 | | |
| JP | 2013078894 A | 5/2013 | | |
| KR | 20040027323 A | 4/2004 | | |
| RU | 2224955 C2 | 2/2004 | | |
| WO | 1997/027759 A1 | 8/1997 | | |
| WO | 1999013707 A1 | 3/1999 | | |
| WO | 2001/029748 A1 | 4/2001 | | |
| WO | WO-2004018217 A1 * | 3/2004 | ............ | A01J 27/005 |
| WO | WO-2017184105 A1 * | 10/2017 | ............ | B41J 23/12 |

OTHER PUBLICATIONS

Written Opinion of the International Searching Authority issued for PCT/US2020/048406, dated Nov. 26, 2020.
International Search Report issued for PCT/US2020/048404, dated Nov. 19, 2020.
Written Opinion of the International Searching Authority issued for PCT/US2020/048404, dated Nov. 19, 2020.
International Search Report issued for PCT/US2020/048407, dated Nov. 19, 2020.
Written Opinion of the International Searching Authority issued for PCT/US2020/048407, dated Nov. 19, 2020.

* cited by examiner

DELIVERY TRAY MOUNTING SYSTEM FOR FOOD PRODUCT PRINTER

CROSS-REFERENCE TO RELATED APPLICATION

The present application claims priority to and the benefit of U.S. provisional application Ser. No. 62/894,323, filed on Aug. 30, 2019, the content of which is hereby incorporated in its entirety.

BACKGROUND

Printing with edible ink on food products is done for purposes of identifying, marking, decorating or personalizing the food product. For example, food products such as cookies can be passed under a print head ejecting edible ink on the top surface of the cookie, whether iced or plain, and printed with a selected design.

Currently, a conveyor belt system or tray is used where one or more cookies are spaced apart in an array on the conveyor belt or tray and passed below the print head of the printer. Alternatively, labels comprised of edible paper can be printed with edible ink and applied to a food item with an edible adhesive such as frosting or icing.

Systems of the prior art that are able to print images on an array of food products supported on a conveyor belt or a tray with two or more columns of food products requires a larger and more expensive printer on the scale of a commercial printer. Such systems also usually require sophisticated sensing systems to locate the position of each food item for printing.

In the prior art systems, the loading and unloading of a food product on a tray or conveyor during printing is generally impractical. The conveyor or tray are often not accessible while products are being printed. It is also difficult to accurately load a food product on a moving conveyor or tray. It is also difficult to load a food product on a moving conveyor or tray without adversely affecting the print quality of the image currently being printed.

SUMMARY

An aspect of the present disclosure relates to a delivery mechanism for delivering food products to a printer for printing on a surface thereof. The delivery mechanism has a motorized tray base spaced apart from the printer and configured to receive a delivery tray supported thereon.

One aspect of the present disclosure relates to a delivery mechanism for delivering food products to a printer for printing on a surface thereof. The delivery mechanism has a motorized tray base spaced apart from the printer and configured to removably receive a delivery tray thereon, the tray base comprising a mounting element configured for engaging with a delivery tray and transferring motion from the tray base to the delivery tray and at least one delivery tray for supporting one or more food products on a first surface thereof. The delivery tray has a receiving element on the first or on a second opposing surface thereof and the receiving element is configured to removably couple to the mounting element of the tray base.

The motorized tray base is operably connected to the printer for providing power and to the motorized tray base.

The motorized tray base is operably connected to a controller of the printer for controlling activation of the tray base for moving the tray operably connected thereto.

The motorized tray base is configured to transfer motion to the delivery tray for controlling movement of the delivery tray.

The tray base has a housing, a rotatable cover to the housing; and a support arm extending from the housing and configured for coupling to a printer system. The base may also have a drivetrain within the housing and configured to transfer torque to the rotatable cover.

The mounting element of the tray base comprises at least one drive post and may comprise two or more drive posts. In one or more embodiments, the mounting element comprises a locating post and at least one drive post. The mounting element is configured for removably coupling to and supporting the delivery tray thereon. The at least one drive post may comprise a shoulder on its length. The base may further comprise one or more support pads spaced apart around the rotatable cover to the housing and wherein the support pads have a height substantially equal to the shoulder of the at least one drive post.

The locating post and the at least one drive post engage with a bottom surface of a tray and wherein the locating post is a center locating post for positioning the tray on the base without tools.

The mounting element is configured to operably support the delivery tray on the tray base and automatically decouple from the delivery tray when sufficient force is applied to the delivery tray to prevent damage to a drivetrain of the tray base.

In or more embodiments, the delivery mechanism comprises a plurality of interchangeable delivery trays wherein the delivery trays have the same or different configurations or dimensions.

Another aspect of the present disclosure relates to a method of delivering food product to a printer and removing printed product from the printer. The method includes providing a tray base spaced apart from a printer and removably coupling a delivery tray to the tray base by positioning the delivery tray over the tray base and engaging one or more receiving element of the delivery tray with one or more corresponding mounting element of the tray base. One or more unprinted food items are loaded onto a respective food support surface of the delivery tray and the delivery tray is moved to advance between unprinted food items. One or more unprinted food items are removed from the respective food support surface for printing and then returned after printing. The delivery tray may then be removed from the tray base without tools.

The printer is configured with a receiving arm for interacting with the delivery tray to receive unprinted food products and return printed food products to the delivery tray and wherein the tray base is motorized and configured for moving the delivery tray in synch with movement of the receiving arm to automatically deliver each one of the plurality of food products to the receiving arm in a sequential manner for printing on the food product and for receiving the returned printed food products for removal from the printer.

Removably coupling the delivery tray to the tray base comprising inserting one or more drive protrusions and/or locating protrusions of the mounting element into corresponding openings of the receiving element of the tray.

Yet another aspect of the present disclosure relates to a system for printing on a surface of a plurality of food products. The system includes a printer configured to print on a surface of a food product; a tray base spaced apart from the printer and the base having a mounting element and a drive element for operably supporting a delivery tray thereon; and a delivery tray having a reciprocal mounting element and reciprocal drive element for removably securing the delivery tray to the tray base without tools, and wherein the delivery tray comprises a plurality of surfaces for holding a plurality of food items. The tray base is a motorized tray base for rotating the delivery tray in synch with the extension and retraction of a receiving arm of the printer to automatically deliver each one of the plurality of food products to the receiving arm in a sequential manner for printing on the food product and for receiving the returned printed food products for removal from the printer.

The surfaces of the delivery tray have one or more support sides for holding one or more sides of the food product and an opening therebetween for receiving an end of the receiving arm therebetween.

The tray base is separable from the printer.

The tray base comprises a housing and a cover plate and wherein the cover plate supports the mounting and drive mechanisms thereon wherein the mounting and drive mechanisms protrude upwardly from the cover plate. One or more support pads protrude upwardly from the cover plate.

DETAILED DESCRIPTION

Figure 1:
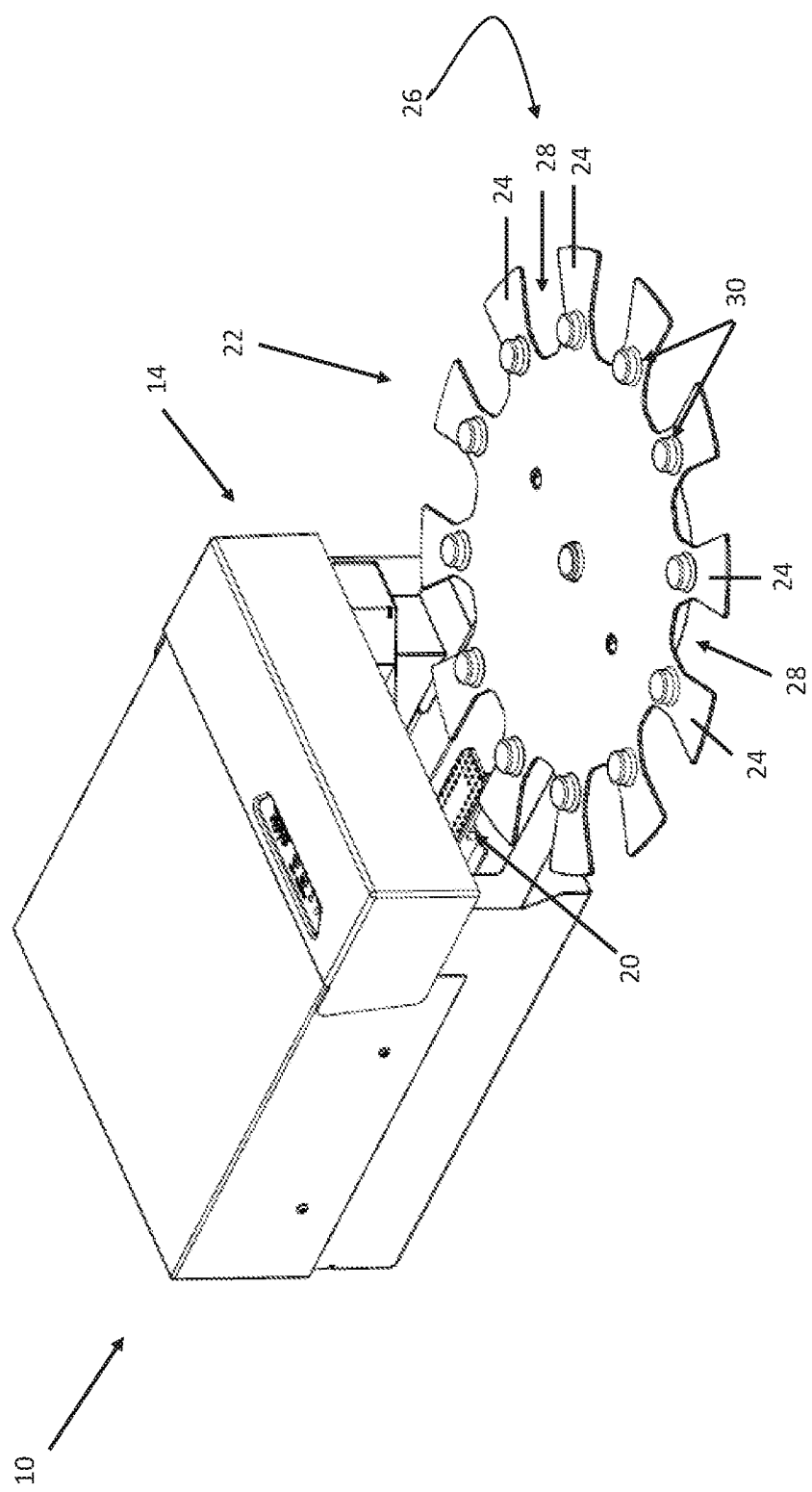
FIG. 1 is a perspective view of a printing system with delivery tray system.
Figure 2:
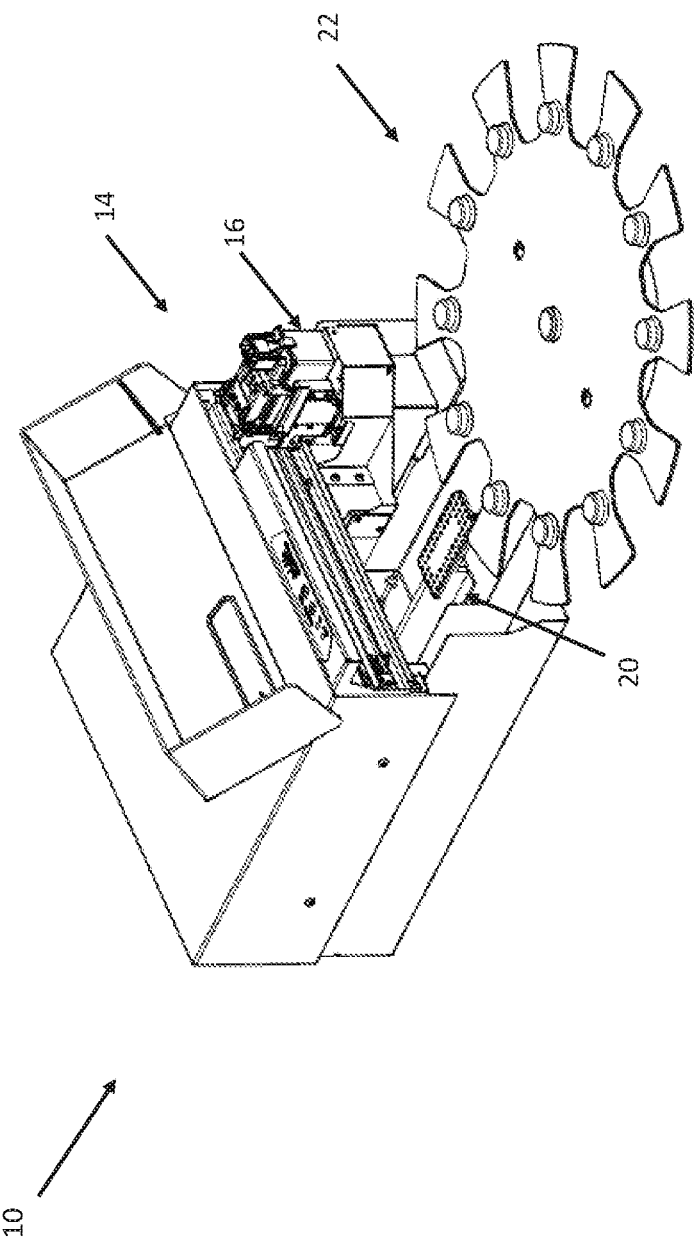
FIG. 2 is a perspective view of a printing system with and open cover portion and the delivery tray system.
Figure 3:
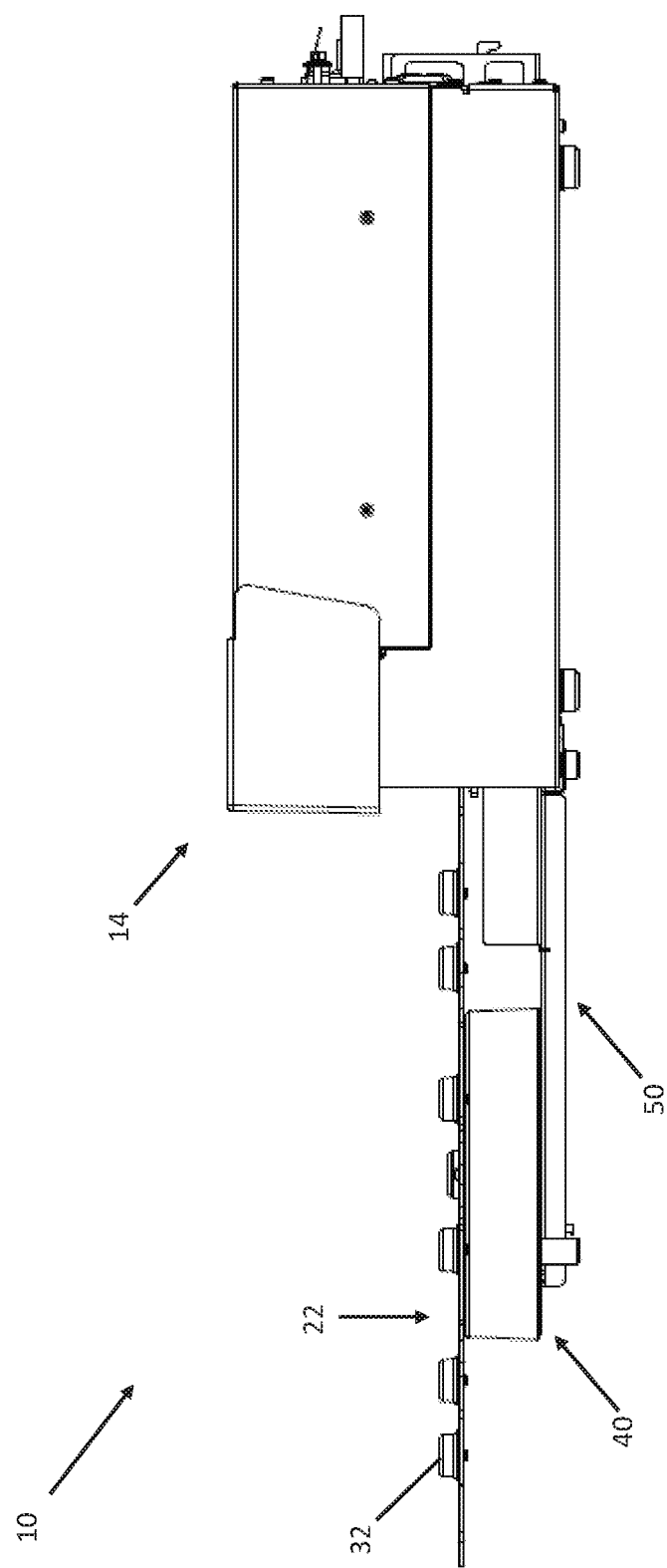
FIG. 3 is a side view of the printing system with delivery tray system.
Figure 4:
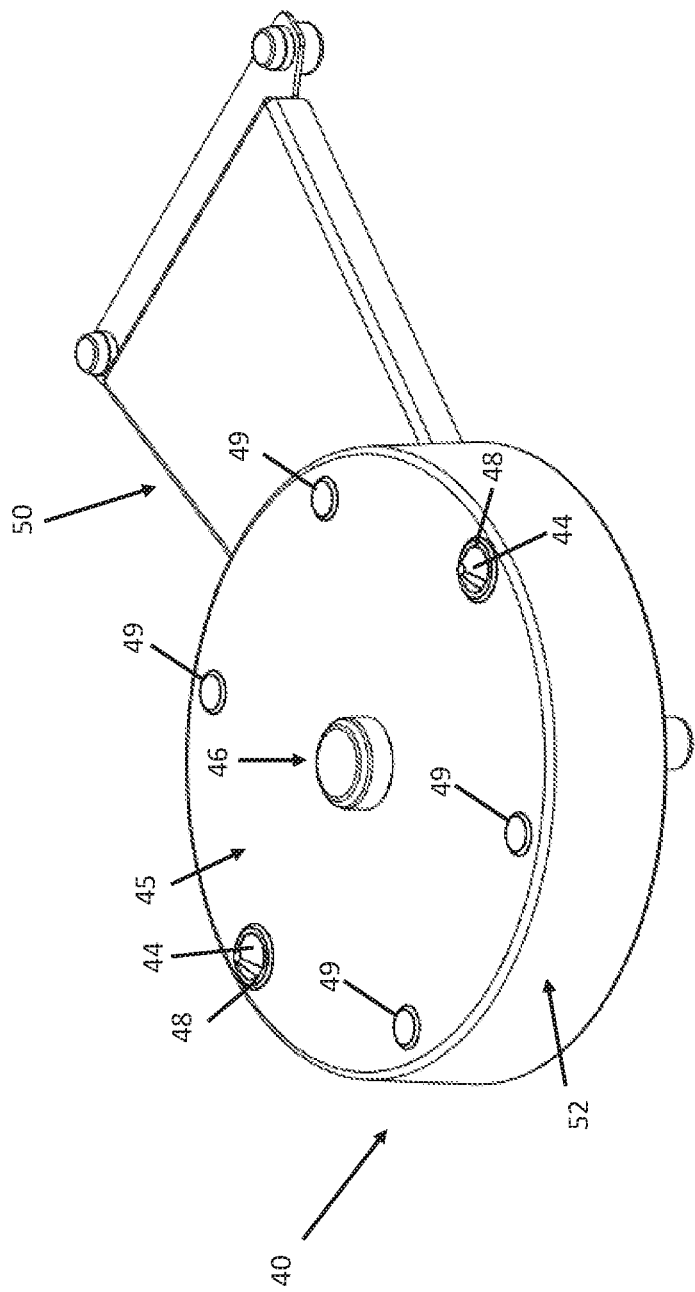
FIG. 4 is a perspective view of the delivery tray system without a tray.
Figure 5:
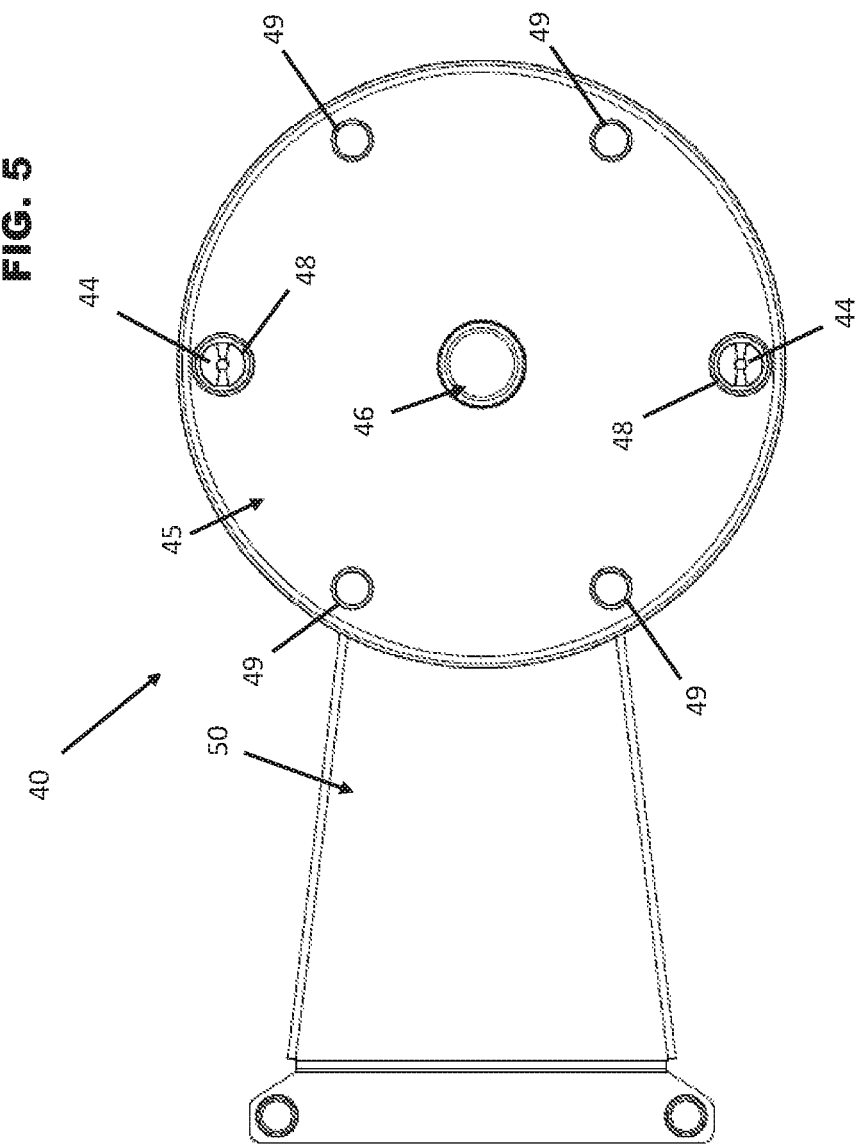
FIG. 5 is a top view of the delivery tray system without a tray.
Figure 6:
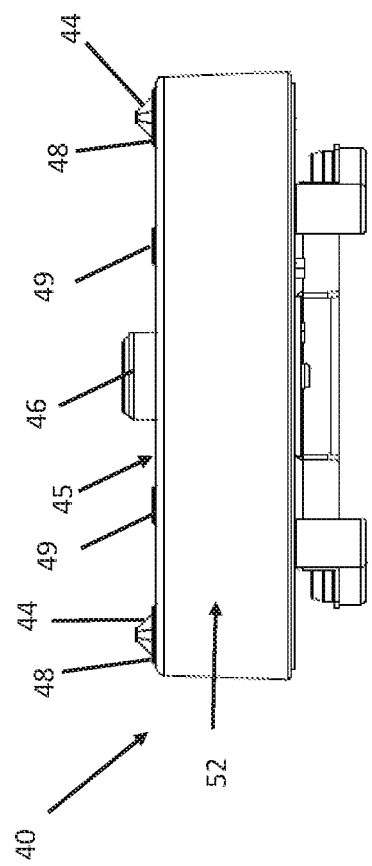
FIG. 6 is a front view of the delivery tray system without a tray.

A food product printing system of the present disclosure includes a printer system for printing an image on a surface of the food product. The print surface may be an actual surface of the food product itself. The printer system comprises a printer having a receiving arm and a delivery tray supported on a tray base. The system may also be provided with a plurality of different delivery trays, each tray configured for continuous delivery of a varied number of food products, and/or for food products of different or specific dimensions.

The receiving arm is configured for receiving a food product from the delivery tray and moving the food product from the delivery tray into the printer and into a printing position. The printing position is substantially below a print head of the printer such that the surface to be printed on is in the path of the print head. Once the food product is printed, the receiving arm then returns the printed food product to the delivery tray. The delivery tray is also configured to move in one or more directions in order to continuously and automatically deliver a plurality of food items sequentially to the receiving arm.

One embodiment of the printing system 10 is illustrated generally in FIGS. 1-9. The printing system 10 is configured to receive a food product 12 from a delivery tray 22, to print on a surface of the food product 12 and return the food product 12 to the delivery tray 22. The system is also configured to do so automatically and continuously for a pre-determined number of food items. The system 10 comprises a printer 14 having a print head 16 and nozzles (not shown) wherein the print head 16 and nozzle are configured for printing with edible ink. The printer 14 also supports an extendable and retractable receiving arm 20.

The receiving arm 20 is operably connected to a power source within the printer 14. The receiving arm 20 is extendable and retractable with respect to the position of the path of the print head 16. The receiving arm 20 has a first end and a second opposing end and a substantially flat receiving surface extending therebetween. The first end is operably connected to a mechanism for retracting and extending the arm 20. The second end and at least a portion of the receiving surface of the receiving arm 20 are configured for extending outwardly from the printer 14. When extended, the receiving arm 20 may receive a food product, hold a food product, and/or return a printed food product to the delivery tray 22. The receiving arm also holds or supports the food product within the printer 14 and during printing on the surface of the food product 12.

With respect to the printer 14, the print head 16 moves linearly back and forth along a gantry in the manner of a standard inkjet printer for ejecting (edible) ink towards the print surface and thus printing pre-selected content on a print surface positioned below the path of the print head 16. The printer 14 is in communication with a controller wherein software may be used to control printing of the content on one or a plurality of food products.

In further detail, the receiving arm 20 moves in a direction perpendicular to the print head path such that the receiving arm 20 extends and retracts across or through the path of the print head 16. In one embodiment, the receiving arm 20 is a substantially flat, rectangular support plate which extends towards a holder 26 of the delivery tray 22 in order to engage with and remove the food product 12 from the delivery tray 22 as well as to return printed food products to the delivery tray. A top surface of the receiving arm 20 is a receiving surface for food product and may be textured or otherwise provided with a surface to increase a co-efficient of friction between the receiving arm 20 and the food product for retaining the food product on the arm 20.

The receiving arm 20 extends to receive or return the food product 12 and retracts from the tray 22 into the printer 14 and into a position below the print head 16 for printing. Once content is printed on a food product, the receiving arm 20 then extends to return the food product 12 back to the delivery tray 22. The delivery tray 22 then advances to provide a second unprinted food product 12 to the receiving arm 20. The receiving arm 20 is also configured for vertical movement such that the receiving surface of the receiving arm 20 is movable between two positions, a raised and a lowered position, where these positions allow the receiving arm 20 to retrieve and return food products 12 with respect to the delivery tray 22, and may allow for advancing of the delivery tray 22 when the receiving arm 20 is extended. Once loaded, the receiving arm 20 is then retracted to the printing position with the food product 12 thereon. This process continues on continuously and automatically until a pre-determined amount of food products are printed. It is also contemplated that the delivery tray may also be raised or lowered in order to allow for the delivery tray 22 to advance to a subsequent holder 26 or opening 28 on the delivery tray 22 for automatically delivering, receiving and thus printing on a plurality of food items.

As illustrated in FIGS. 3-8, positioned adjacent or near the printing system is a base 40 for providing power and controlling advancement and vertical positioning of the delivery tray 22. The tray base 40 is spaced apart from the printer 14 and may be removably connected to the printer 14 via a connecting arm 50 that extends from a housing 52 of the tray base 40 to removable connection or coupling to a housing of the printer 14. The housing 52 further comprises a rotatable cover 45. The cover 45 is operably rotatable about an axis of the tray base 40 by way of a drivetrain within the housing 52 and which transfers torque to the cover 45. The arm 50 also positions the tray base 40 at an adjustable distance from the printer 14 and receiving arm 20 so as to accommodate the delivery tray 22 supported thereon. The tray base 40 may also be operably connected to the controller and to the power supply of the printer 14 so as to control movement of the tray 22 in a manner synchronized with the printer 14.

Figure 7:
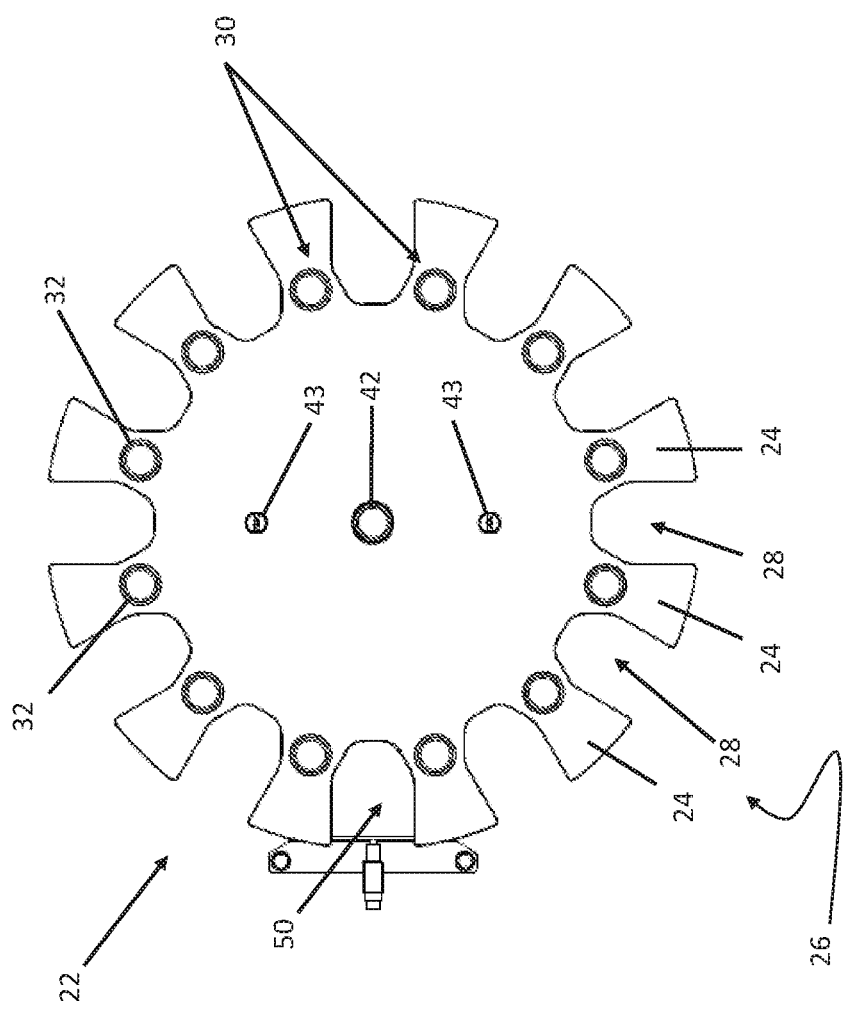
FIG. 7 is a top view of the delivery tray system with a tray thereon.
Figure 8:
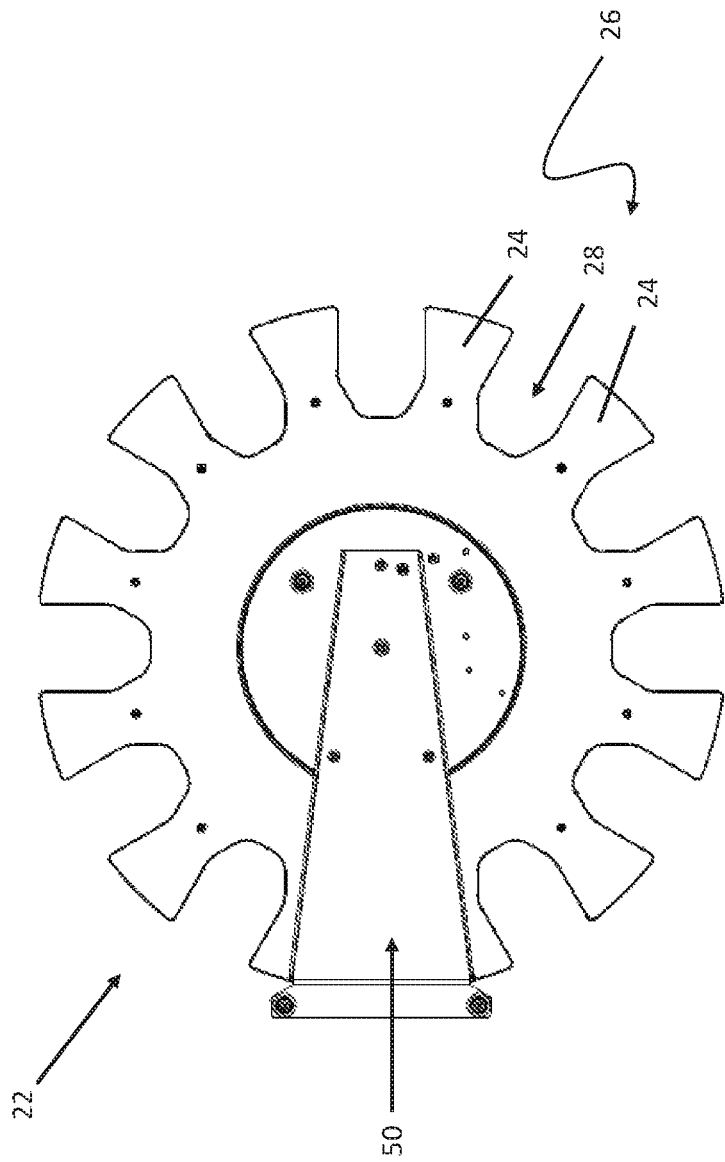
FIG. 8 is a bottom view of the delivery tray system with a tray thereon.
Figure 9:
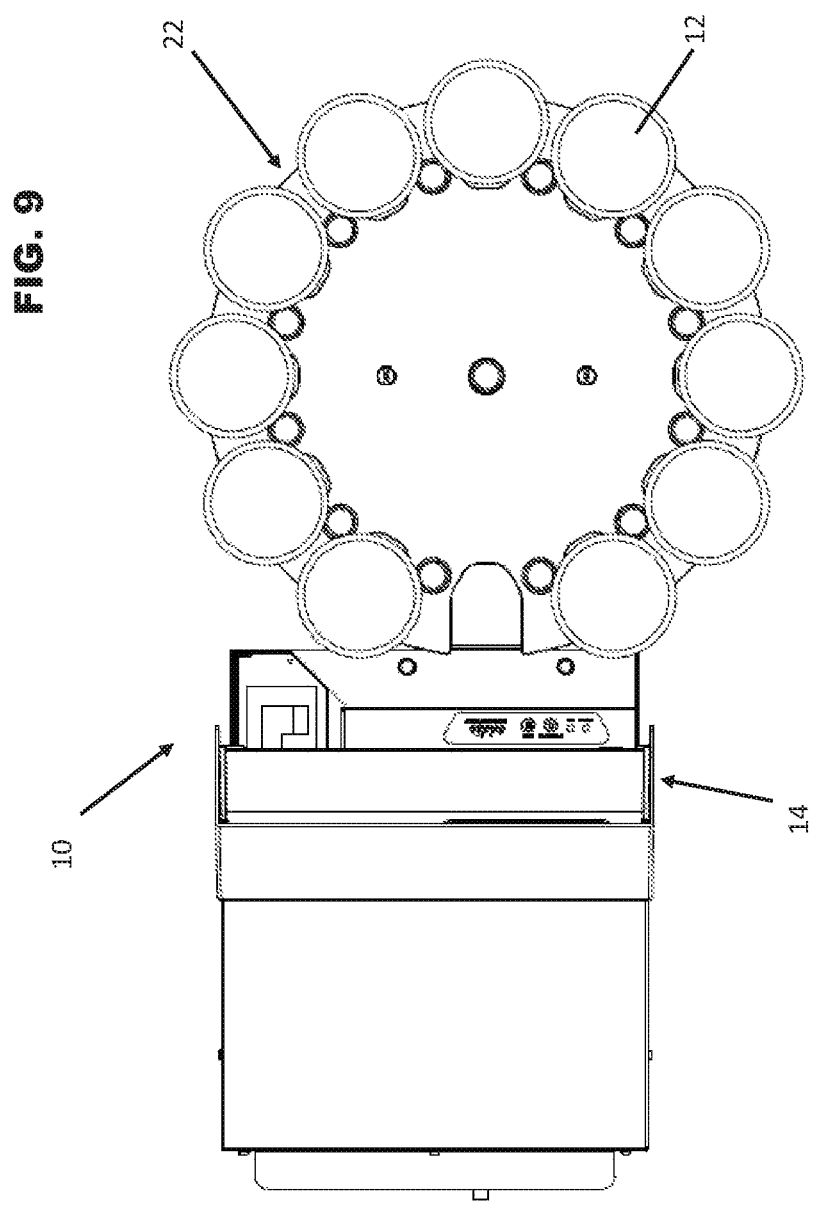
FIG. 9 is a top view of the printing system with delivery tray and product thereon for printing.

Referring to FIGS. 7-9, the delivery tray 22 is a configured with a plurality of holders 26 as described in further detail below. Each holder 26 is configured to receive and support a food product 12 and deliver said food product 12 to the receiving arm 20. The delivery tray illustrated includes twelve (12) of holders 26, however, trays for holding fewer or more food products are contemplated and within the scope of this disclosure. The number of holders on a tray may be adjusted based on the type or size of item being printed.

In further detail, each holder 26 has two support sides 24 extending from a center area of the tray 22 and an opening 28 between these support sides 24. The food product 12 is supported on the holder by way of resting on top of the two support sides 24 of the holder. The opening 28 between the sides 24 of the holder 26 is configured to receive the receiving arm 20 therein and allows for the receiving arm 20 to take a position for receiving and returning the food product to the delivery tray 22. That is, the receiving arm 20 can extend into this opening 28 and contact a bottom surface of the food product 12 that is supported on the sides 24 of the holder 26. The receiving arm 20 then supports the food product 12 thereon when retracting the food product 12 into the position for printing.

Each holder 26 is configured to support or otherwise hold one or more sides, edges or perimeter lengths of the food product 12 via contact of the support sides 24 with the bottom surface of the food product 12. The holders 26 may have one or more positioning mechanisms 30 for directing a position of the food product 12 when loaded onto the delivery tray 22. Positioning mechanisms 30 are provided, for example, on each of the support sides 24. Utilizing the positioning mechanisms 30 to set the position of the food product 12 during loading of the delivery tray 22 ensures delivery of the food product 12 to the receiving arm 20 such that the food product is balanced on and supported by the receiving arm 20 and ensures the surface of the food product is centered for printing of the content on the food product.

In the embodiment illustrated in FIG. 7, the positioning mechanisms 30 each include a pair of positioning elements 32 protruding upwardly from the tray 22 and configured to mark the placement location for a round food product 12 on the delivery tray 22. Each one of the pair of positioning elements 32 protrudes from a location on a corresponding one of the support sides 24 of each holder 26. A forward surface of the food item contacts the positioning elements 32 to ensure sufficient placement for delivery to the receiving arm 20 when the food product 12 is placed on the holder 26.

The delivery tray 22 advances about the openings 28 such that the delivery tray 22 advances from one opening 28 to the next adjacent opening 28 automatically after a food product 12 has been returned to the tray 22 by the receiving arm 20. For example, in the embodiment illustrated, the delivery tray 22 is a generally round tray that is rotatable about its center to advance the position of the holders 26 with respect to delivery of subsequent food products 12 to the receiving arm 20. The holders 26 are spaced apart around the perimeter of the delivery tray 22.

In the embodiment illustrated in the figures, and referring back to FIGS. 4-6, the delivery mechanism may be a carousel for continuous delivery, loading and reloading of unprinted food products after printed food products have been returned to the delivery tray 22 and subsequently removed. While a rotatable tray is illustrated herein, the delivery tray 22 may also be linearly advanced, move in multiple directions, or move in the manner of a conveyor belt, by way of non-limiting examples. That is, once printed and returned to the delivery tray 22 as the delivery tray 22 advances to the next adjacent opening 28 for purposes of delivering one or more subsequent food products 12 to the printer 14, the printed and advanced food product may be removed and a new unprinted food product 12 placed on the tray 22. Thus, delivery of unprinted food products and receipt of said food products after printing can be essentially endless, limited only by supply or selection of a predetermined amount to be printed, for example.

The delivery tray 22 moves about an operable connection with a tray base 40 wherein a mounting system allows the delivery tray 22 to be installed and removed easily, quickly and without tools or other equipment. This allows a user to switch delivery trays 22 to different sizes and types, for example, depending on the types of food product being printed. The delivery tray 22 may rotate or advance in a linear manner, or other directional movement which advances the delivery tray from one opening 28 to the next adjacent opening 28. In one non-limiting embodiment, as illustrated, the delivery tray 22 rotates about the operable connection with the tray base 40.

While the illustrated embodiment shows the delivery tray 22 mounted in a position on top of or over base 40, in one or more embodiments, the mounting mechanism may include alternative mounting mechanisms where for example the delivery tray 22 is rotated and/or secured from a connection above the tray 22 such that the tray 22 is secured to a base for operation by way of a mechanism such as an arm or crane.

In further detail as illustrated in FIGS. 4-9, the tray base 40 comprises a locating element 46, which easily and accurately centers the delivery tray 22 on the tray base 40. Each delivery tray 22 is provided with a reciprocal locating element 42 which is configured to mate with the corresponding locating element 46 on the tray base 40. The tray base 40 and the connections between the tray base 40 and the tray 22 are configured for supporting the tray 22 in an upright position with the food support surfaces being a top surface and the tray in a substantially level position for supporting food product thereon in a movable manner. The locating element 46 may generally be a center locating element 46 that is positioned approximately in the center of the tray base 40 with the corresponding locating element 42 substantially centered on the bottom surface of the tray 22 or at the center of gravity of the delivery tray 22. As such, the reciprocal locating element 46 of the tray base 40 may be a post or other protrusion extending from the tray base 40. The locating element 42 on the tray 22 may then be a hole or concave portion from the bottom of the tray 22 or other divot providing a convex portion on the top of the tray 22 and having a surface with inner dimensions to substantially match the outer dimension of the locating element 46 and allowing the tray 22 to rotate or move thereabout. As such, the locating element 46 allows the delivery tray 22 to be operably supported thereon.

The tray base 40 also comprises one or more drive posts 44 which extend upwardly from the upper cover 45 of the housing 52 of the tray base 40 and engage with receiving mechanisms 43 of the tray 22 to rotate the tray 22. The center locating element 46 and the drive post or drive posts 44 automatically locate the center of the delivery tray 22 during tray 22 installation and effect movement of the tray 22. The drive posts 44 also drive the tray 22, for example, rotate the tray 22, to continuously and automatically bring food products 12 to and from the receiving arm 20. The drive posts 44 may be tapered drive posts 44 which are integrally connected to and rotate with rotation of the upper cover 45. The drive posts 44 then frictionally engage or otherwise securely but removably engage with the corresponding receiving or drive mechanisms 43, such as openings on the bottom of the tray 22. Together, these elements allow the movement of the upper cover 43 to move the drive posts 44 which then transfer the motion to the tray 22. At the same time, as the tray 22 is set upon the tray base 40 and thus allows gravity and/or the weight of the tray 22 itself to maintain the tray 22 on top of the drive posts 44 and locating post 46, the tapered drive posts 44 also allow the delivery tray 22 to break free from removable connection with the tray base 40 without damaging a gear train within the tray base 40. For example, should an external force occur, such as a bump to the delivery tray 22 such as may occur when loading or unloading the tray 22, the tray 22 rotates and rides up the tapered drive posts 44 to lift off the tray base 40 without damage to the gear train of the tray base 40. The tapered drive posts 44 then also prevent interference with the movement of the tray 22 from unintended external forces such a bump as the tray 22 can re-orient itself about the drive posts 44 and reciprocal drive mechanisms 43 and continue operation.

It should be understood that while the embodiment illustrated refers to protrusions on the tray base 40 that engage with holes or divots in the tray 22 for connection, that an alternative configuration is also contemplated. Such configuration includes holes or divots in the cover 45 of the tray base 40 that receive protrusions extending from the tray 22 such that the tray engages with the tray base 40 by way of this connection and functions for transfer of movement from the tray base 40 to the tray 22 in a similar manner as described herein.

Incorporating one or two drive posts 44 also provides a visible indicia that the delivery tray 22 has or has not been placed on the tray base 40 properly, ensuring proper installation. The delivery tray 22 will not rest in a substantially level position if it is not properly located over the drive posts 44 of the tray base 40.

Each drive post 44 is provided with a shoulder 48 that is positioned at substantially the same level or height as a plurality of support pads 49 spaced around the outside of the cover 45 of the tray base 40. For example, the support pads 49 and the shoulder 48 of each drive post 44 combine to support the tray 22 in a level position on the tray base 40. In the embodiment illustrated, four support pads 49 are provided on the tray base 40. The support pads 49 may also support the delivery tray 22 slightly above the above the main upper surface of the base cover 45, for example with a space of about 0.040" between the upper surface of the cover 45 and the bottom surface of the tray 22. The pads 29 may then also provide some clearance for debris, such as food product crumbs, to aid in allowing the delivery tray to remain in a substantially level position when coupled to the tray base 40. The pads 49 also allow for some cupping of the base cover 45 and/or the delivery tray 22 while maintaining a stable connection, for example, eliminating of tray 22 rocking, the stable connection enabled between the tray base 40 and the delivery tray 22.

In additional or alternative embodiments, the tray base 40 and tray 22 may be provided with various connection mechanisms. For example, two or more drive posts 44 may be used to locate the delivery tray 22 and thus eliminating the need for the locating element 46. The drive posts 44 could also be configured to allow for continued rotational movement relative to the tray base 40 when the delivery tray 22 is bumped, but while preventing translational movement. It is also contemplated and within the scope of this disclosure that the locating element 46 may incorporate features to locate and drive the delivery tray 22 so as to eliminate the need for one or more drive posts 44. Additional mechanisms include but are not limited to one or more ramps (not pictured) at the outer diameter of the locating element 46 so the delivery tray 22 could again rotate, but not translate, when bumped.

It is also contemplated and within the scope of this disclosure that in one or more embodiments and/or alternative embodiments described here that the delivery 22 may be driven by the base 40 without the inclusion of drive posts 44. For example, the tray 22 may be driven by a frictional or other engagement generated between the base 40 and the tray 22. Irregular features may be provided to one or both of the tray 22 and base 40 which allow the base 40 and tray 22 to operable connect to one other another. Clips, fasteners, and/or other mechanisms for operable connection that allow the base 40 to advance the tray 22 between delivery positions may also be provided.

A drivetrain including a gear train is provided within a housing 52 of the tray base 40 and can be connected to the power source of the printer 14. This system allows various delivery trays 22 of different dimensions and arrangements for holding food products 12 to moveably connect with the tray base 40. While the above interface is described, alternative interfaces and non-locking mechanisms for transferring movement generated at the tray base 40 to the tray 22 for controlled advancement of the delivery tray 22 are contemplated.

The tray base 40 may comprise its own power source for providing rotational power to the drive posts 44, or the tray base 40 may be operably connected to the power source of the printer system 10. The tray base 40 is also in communication with the controller which controls extension and retraction of the receiving arm 20 and printing of an image on a received food product 12 such that the rotation of the delivery tray is synchronized with the extension and/or retraction of the receiving arm 20.

In the embodiment illustrated, the tray base 40 provides the power to rotate the delivery tray 22 between various positions which include alignment of a first and one or more subsequent openings 28 with the extended receiving arm 20 as well as rotating the delivery tray 22 to advance the delivery tray 22 to a next opening 28 while the receiving arm 20 is extended. In embodiments where the delivery tray 22 may be in one of two positions, the raised or lowered position, depending on whether an item is to be delivered from or returned to the tray 22 and to prevent the receiving arm 20 from interfering with advancing or rotation of the delivery tray 22, the tray base 40 also allows for moving the delivery tray 22 between the two positions and thus is configured to raise and lower the tray or tilt the tray 22 upwardly or downwardly at the opening 28 positioned for delivery or return of the food product 12. In all embodiments, as the receiving arm 20 is extended and positioned in the opening 28, the upper surface of the receiving arm 20 may be slightly below the top surface of the delivery tray 22. To ensure or facilitate delivery of the food product 12 supported on the delivery tray 22, the delivery tray 22 may be downwardly tilted or lowered in the direction of the receiving arm 20, alternatively or additionally, the receiving arm 20 may be lifted to allow the receiving arm 20 to contact and support a bottom surface of the food product 12 and remove the food product from support by the delivery tray 22 thereby transferring the food product 12 to the receiving arm 20. Conversely, when the receiving arm 20 is returning a food product after printing thereon, the delivery tray 22 may be provided in a lowered position and then tilted upwardly or raised after the receiving arm 20 supporting the printed-on food item is extended into opening 28 which allows the holder 26 to lift the food product off the receiving arm 20 for removal from the printing queue. Additionally or alternatively, the receiving arm 20 may be lowered for transferring the food product 12 from the receiving arm 20 to the delivery tray 22.

In the illustrated embodiment the food product is a dessert item such as a cookie. However, while examples of food items include various shapes, sizes, and types of cookies, the food items that can be printed with this system are not so limited. Frosting sheets, rice paper, and bakery goods having at least one substantially flat surface for printing an image thereon, and other food items may be printed using this system. The delivery tray may be configured with positioning mechanisms which are tailored to the specific shape, size, thickness, type, etc. of food product to be printed and thus, the system may be provided as a kit including the printer described herein including receiving arm and one or more delivery trays of various sizes, dimensions and for delivery of one or more different food products or food products having different dimensions.

The system is further configured with one or more control boards in communication with a computer or controller for configuring and initiating the printing process. However, the delivery tray is configured with one or more positioning mechanisms such that in combination with the receiving arm as a food product is delivered to the printer and positioned below the print head, the need for a sensing system or series of sensors for detecting the position of the food product is eliminated. A sensor may be utilized in the printer for confirming the presence of the food product in the printer for printing. The sensors may be positioned on the print head and used to detect only the presence of the substrate for printing. The system is a fixed spot printing system so there is no need for scanning for position of the print surface. The system also allows for loading of unprinted food products and unloading of printed food products during printing or otherwise "on the fly." The control board or boards allow for the delivery of a first food product, printing of the first food product, return of the first food product, advancing of the delivery tray to provide a second food product for delivery, delivery of the second food product, printing of the second food product, return of the second food product to the delivery tray and advancing for delivery of one or more subsequent food products for printing and return. Thus, the system allows for the automatic delivery, printing on and return of a plurality of food products.

Although the present disclosure has been described with reference to preferred embodiments, workers skilled in the art will recognize that changes may be made in form and detail without departing from the spirit and scope of the disclosure.

The invention claimed is:

1. A delivery mechanism for delivering food products to a printer for printing on a surface thereof, the mechanism comprising:
   a motorized tray base spaced apart from the printer and configured to removably receive a delivery tray thereon, the tray base supporting the delivery tray at a location spaced apart from the printer and comprising:
   a housing;
   a rotatable cover to the housing; and
   a mounting element configured for engaging with a delivery tray and transferring motion from the tray base to the delivery tray, the mounting element comprising a locating post and at least one drive post for removably coupling to and supporting the delivery tray thereon; and
   at least one delivery tray for supporting one or more food products on a surface thereof and the delivery tray comprising a receiving element configured to removably couple to the mounting element of the tray base.

2. The mechanism of claim 1 wherein the motorized tray base is operably connected to the printer for providing power to the motorized tray base.

3. The mechanism of claim 1 wherein the motorized tray base is operably connected to a controller of the printer for controlling activation of the tray base for moving the tray operably connected thereto.

4. The mechanism of claim 1 wherein the motorized tray base is configured to transfer motion to the delivery tray for controlling movement of the delivery tray.

5. The mechanism of claim 1 wherein the tray base comprises a support arm extending from the housing and configured for removably coupling to a printer system.

6. The mechanism of claim 1 and further comprising a drivetrain within the housing and configured to transfer torque to the rotatable cover.

7. The mechanism of claim 1 wherein the at least one drive post comprises a shoulder on its length.

8. The mechanism of claim 7 wherein the base further comprises one or more support pads spaced apart around the rotatable cover to the housing and wherein the support pads have a height substantially equal to the shoulder of the at least one drive post.

9. The mechanism of claim 1, wherein the locating post and the at least one drive post engage with a bottom surface of a tray and wherein the locating post is a center locating post for positioning the tray on the base without tools.

10. The mechanism of claim 1 wherein the mounting element is configured to operably support the delivery tray on the tray base and automatically decouple from the delivery tray when sufficient force is applied to the delivery tray to prevent damage to a drivetrain of the support base.

11. The mechanism of claim 1 and further comprising a plurality of interchangeable delivery trays wherein the delivery trays have the same or different configurations or dimensions.

12. A system for printing on a surface of a plurality of food products, the system comprising:

a printer configured to print on a surface of a food product;

a tray base spaced apart from the printer and the tray base having a mounting element and a drive element for operably supporting a delivery tray thereon; and a delivery tray having a reciprocal mounting element and reciprocal drive element for removably securing the delivery tray to the tray base without tools, and wherein the delivery tray comprises a plurality of surfaces for holding a plurality of food items spaced apart from the printer, wherein the tray base is a motorized tray base for rotating the delivery tray in synch with the extension and retraction of a receiving arm of the printer such that the tray base and delivery tray automatically deliver each one of the plurality of food products to the receiving arm in a sequential manner where the receiving arm positions the received food product in the printer for printing on the food product and returns printed food products to the delivery tray for removal from the printer, and wherein the tray base comprises a support arm extending from the housing and configured for removably coupling to the printer.

13. The system of claim 12, wherein the surfaces of the delivery tray have two or more support sides for holding one or more sides of the food product and an opening therebetween for receiving an end of the receiving arm therebetween.

14. The system of claim 12 wherein the tray base is separable from the printer.

15. The system of claim 12 wherein the tray base comprises a housing and a cover plate and wherein the cover plate supports the mounting and drive elements thereon wherein the mounting and drive elements protrude upwardly from the cover plate.

16. The system of claim 15 and further comprising one or more support pads protruding upwardly from the cover plate.

* * * * *